United States Patent

[11] 3,549,015

| [72] | Inventor | Allan H. Willinger<br>New Rochelle, N.Y. |
|---|---|---|
| [21] | Appl. No. | 776,517 |
| [22] | Filed | Nov. 18, 1968 |
| [45] | Patented | Dec. 22, 1970 |
| [73] | Assignee | Metaframe Corporation<br>Hawthorne, Calif.<br>a corporation of Delaware. by mesne<br>assignment |

[54] ADJUSTABLE HAND OPERATED AQUARIUM CLEANING PUMP
3 Claims, 6 Drawing Figs.

[52] U.S. Cl................................................... 210/416,
43/4; 119/5; 222/382, 222/464; 92/34; 417/569,
417/435; 92/58.1
[51] Int. Cl...................................................... F04b 43/00
[50] Field of Search......................................... 103/148;
230/169; 43/4; 119/5; 222/382, 464

[56] References Cited
UNITED STATES PATENTS

| 614,465 | 11/1898 | Habermann.................. | 222/464 |
| 1,977,328 | 10/1934 | Sousley........................ | 222/464 |
| 3,158,104 | 11/1964 | Hutchinson.................. | 103/148 |

Primary Examiner—Mark M. Newman
Assistant Examiner—Wilbur J. Goodlin
Attorney—Friedman and Goodman ABSTRACT: A hand operated aquarium cleaning pump comprising, in combination, a water pumping means and an adjustable inlet therefor, said pump being selectively positionable within said aquarium tank and said inlet being telescopically adjustable to a position adjacent the tank bottom which requires cleaning.

PATENTED DEC 22 1970
3,549,015
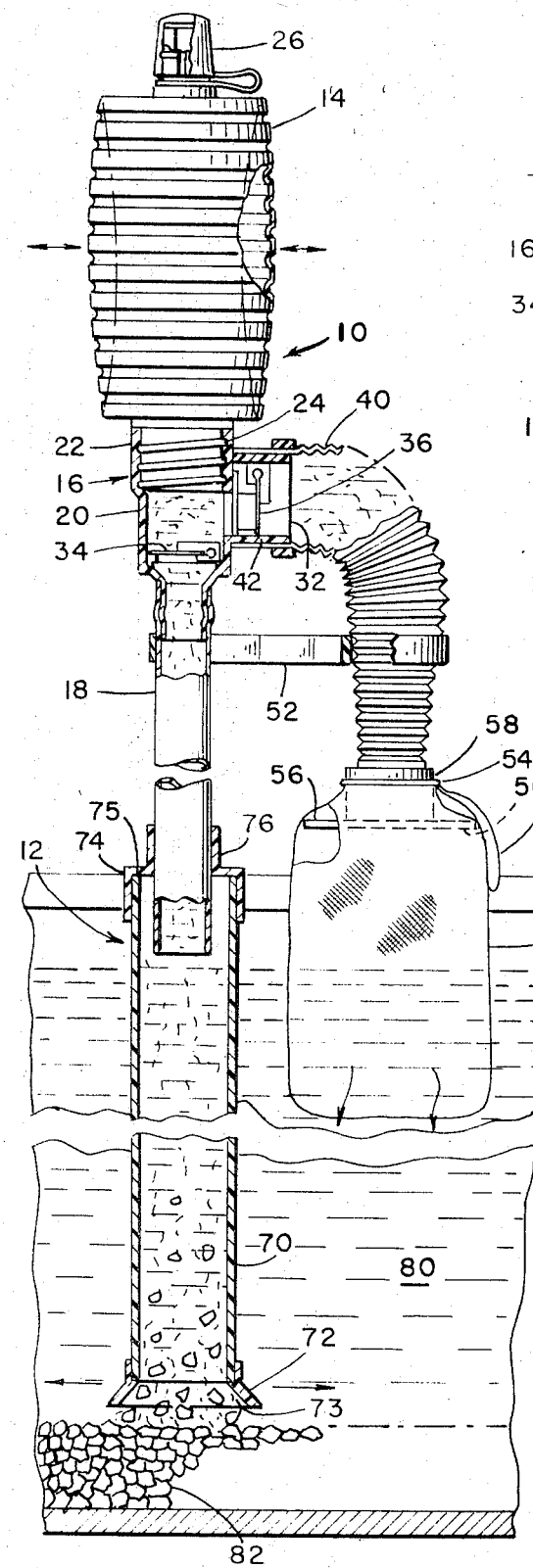
FIG.1
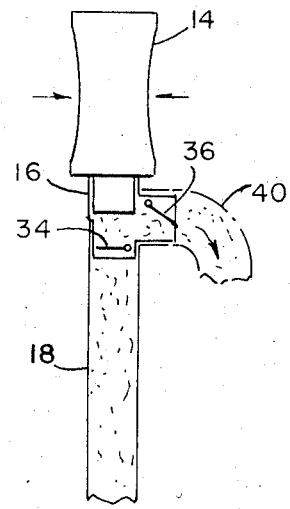
FIG.2
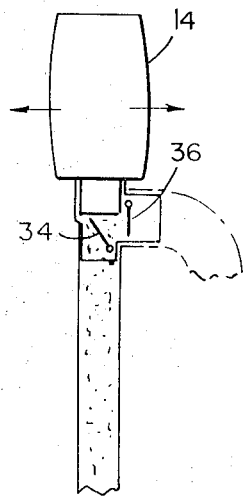
FIG.3
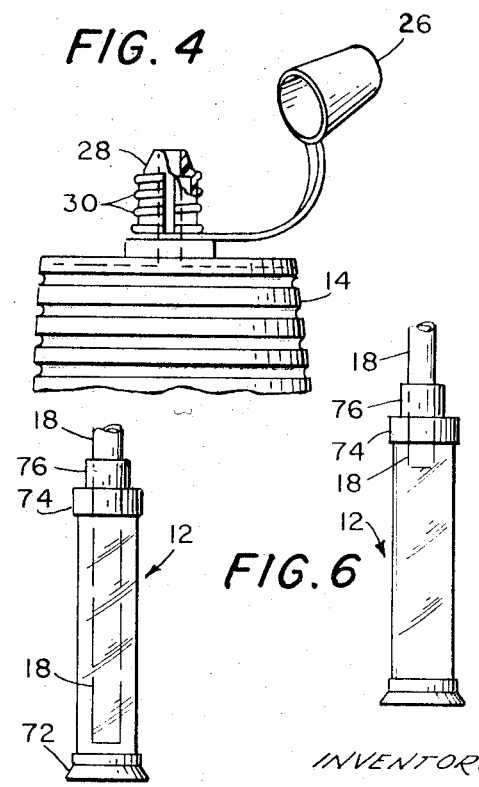
FIG.4
FIG.5
FIG.6
INVENTOR.
ALLAN H. WILLINGER
By Friedman & Goodman
ATTORNEYS

ADJUSTABLE HAND OPERATED AQUARIUM CLEANING PUMP

BACKGROUND OF THE INVENTION

As is well known to the aquarium hobbyist, algae, food debris, waste debris and similar contaminants tend to accumulate in the aquarium housing the pet fish. It is considered essential to the health of the fish that such contaminants, aforementioned, be removed from the aquarium water. Moreover, such debris can become quite unsightly on the floor of the tank.

It is of course equally well known to the prior art to employ hand operated or electrically operated pumps to remove the contaminating debris from the aquarium tank. It is a problem with aquarium filters, that once installed their position becomes static in the tank, and aquarium debris settles on the bottom of the aquarium, prior art devices have to be permanently adjusted for a particular depth aquarium, restricting their practical use to only that size aquarium. One prior art device uses an unwieldy long flexible pipe attached to the bag to solve this problem, which requires the use of two hands to operate it. Of course the unit would be workable with the tube fully extended, however, this would lead to the following problem. If water is allowed to pour out of the filter bag from a height above the surface of the water, it will spread the dirt and debris laying on the bottom into a cloud of "dust," rendering it impossible to remove until it settles after many, many hours. Moreover, these pumps are unwieldy insofar as their manipulation around the aquarium is concerned. Whereas a hand operated pump has been used to some advantage, since it can be moved from place to place, still it has been a problem in the prior art, particularly in that it cannot be adjusted other than as mentioned above to compensate for differing water levels either within the same tank or between different tanks. Thus, prior art pumps, whether electrically or hand operated, are not sufficiently versatile for tanks of varying water depths, nor are they adapted to be effectively used at different water levels within a single tank.

It would, therefore, be of tremendous advantage if a hand operated pump could be provided which was adjustable as to water depth and thus flexible in its positioning with respect to the area to be cleaned.

SUMMARY OF THE INVENTION

It is, therefore, among one of the principal objectives of the invention to provide such a pump, aforementioned, that would eliminate the current prior art problems.

In accordance with the present invention there is now provided, a hand operated aquarium cleaning pump comprising, in combination, a water pumping means and an inlet therefor, said pumping means being selectively moveable within the aquarium tank and the pump inlet being telescopically adjustable to any selected depth, said pumping means also having conduit means for returning filtered water to said aquarium tank.

BRIEF DESCRIPTION OF THE DRAWING

The invention will be hereinafter more fully described with reference to the accompanying drawing, in which:

FIG. 1 is a reduced, partially fragmented, partially sectional, side view of the invention pump as shown in an aquarium tank;

FIG. 2 is a diagrammatic fragmented view of the pump in the discharge condition;

FIG. 3 is a view similar to FIG. 2, except that as shown the pump is in the charge condition;

FIG. 4 is a fragmented, partially sectional view of the venting means of the pump in the open position;

FIG. 5 is a fragmented view showing the pump in the lowered position; and

FIG. 6 is a view similar to FIG. 5 except that as here shown the pump is in the raised position.

DESCRIPTION OF THE PREFERRED EMBODIMENTS

Referring now to the FIGS. of the drawing, and especially to FIG. 1, there is shown an aquarium cleaning pump 10 including a selectively adjustable inlet housing 12, both made of a suitable plastic. Pump 10 comprises a squeezable bulb 14, which serves a dual function acting both as a pump priming member and as a water reservoir, in a manner which will be more fully described hereinbelow, squeezable bulb 14 being forcefitted into a water-charging tube 16. Water-charging tube 16 consists of an elongated tubular main body portion 18 joined to a valve housing portion 20, which valve portion 20 is in turn joined to a receiving collar 22, into which bulb 14 is force-fitted, as aforementioned. It is to be understood that tubular body portion 18, valve housing 20 and receiving collar 22 are all in registered relation to allow for a flow of water therethrough. Moreover, tubular body portion 18 is of a smaller diameter than valve housing 20, which is in turn of a smaller diameter than receiving collar 22. A threaded neck portion 24 on bulb 14 aids in maintaining the aforesaid forcefit into the receiving collar 22. A venting cap 26 is also provided for a vent 28 located at the top of squeezable bulb 14. Vent 28 is also threaded as at 30, so that venting cap 26 may be tightly force-fitted thereover (FIG. 4).

Valve housing 20 further comprises a right angle valve chamber 32, in which is positioned a pair of associatingly functioning "flipper" valves 34, 36, valve 34 acting to regulate the ingress of water into the pump and valve 36 acting to regulate the egress of water out of the pump. A water discharge pipe 40 is fitted over the right angle arm 42 of valve chamber 32 and by virtue of its accordion-pleated construction, discharge pipe 40 may be easily directed downwardly in the direction of the aquarium 50, as will be seen. A support member 52 disposed between discharge pipe 40 and main tubular body portion 18, and connecting the two, serves to hold discharge pipe 40 in a generally parallel relation to tubular portion 18.

Discharge pipe 40 extends about ⅓ of the way down tubular body portion 18, and has a cylindrical collar 54 with an outwardly extending circular base portion 56 fitted over its discharge end 58. A cloth filter bag 60, e.g. cheese-cloth, or muslin, or the like, is fitted over and tied around circular base 56 and collar 54 by a string 62.

In the manner of the invention, pump 10 is adapted to be telescopically adjustable by providing a housing 12 therefor, into which main tubular body portion 18 slidingly fits FIGS. 1, 5, 6). Housing 12 is an elongated tubular body 70 having a funnel shaped collar 72 at its lower end 73 and a cylindrically shaped collar 74 at its upper end 75 which is force-fitted over said upper end. Collar 74 is in turn integrally joined to another cylindrical collar 76 which is sized so as to receive main tubular body portion 18 of the pump in sliding, but generally airtight relation. Thus, pump 10 is adapted to be raised or lowered within housing 12 in telescopic fashion.

Describing now the operation of the invention combination, when it is desired to clean the debris from an aquarium tank 50 containing water 80 and a gravel bed 82, what is done is to rest housing 12 vertically onto gravel bed 82 and then the height of the pump 10 is adjusted until filter bag 60 is at least partially submerged in the aquarium water, as shown in FIG. 1. As aforementioned, the pump 10 is adjusted by slidingly lowering or raising tubular body portion 18 of the pump within housing 12. Tubular body portion 18 may be inserted into the water or out of it, since by virtue of the airtight fit tubular body portion 18 within collar 76, the housing 12 will, in effect, act as an extension of tubular body portion 18. For example, as shown in FIG. 1, the tubular portion 18 is raised above the level of the water in the aquarium. This, then, is one of the outstanding advantages of the invention, that the pump 10 may be adjusted to clear debris from a variety of aquariums of differing depths and consequently differing water levels. Moreover, the pump 10 may be used at various levels in the water so long as the filter bag 60 is kept in contact with the water, by varying the height of the pump as described.

Continuing the sequence of operation, with the vent cap 26 in place, the pump is primed by hand squeezing bulb 14 (FIG. 2) which closes flipper valve 34, communicating with discharge pipe 40. When the bulb 14 is released (FIG. 3), water is drawn up into water-charging tube 16, forcing open flipper valve 34, and valve 36 is caused to close, thus allowing the debris-laden water to fill into the inside of bulb 14. The debris-laden water is then discharged by squeezing the bulb 14 again (FIG. 2) causing the stored water flow to force open flipper valve 36 and allowing this debris-laden water to pass into discharge pipe 40 from whence it passes into filter bag 60, where the debris is filtered out by the bag walls and the now debris-free water passes back into the tank via the bag walls. Any gravel drawn up into housing 12, falls back to the tank bottom by gravitational force. When it is desirous to remove the pump from the aquarium entirely, the pump is raised clear of the water and the venting cap 26 is removed allowing water to drain completely from the pump.

It can be seen that by virtue of its adjustable nature, the instant hand operated aquarium cleaning pump may be employed at various angles, in tight places and at differing depths. Its extreme utility is in its extremely adjustable nature.

I claim:

1. A hand operated cleaning pump for an aquarium tank comprising, in combination, a water pumping means and an inlet housing therefor, said pumping means being selectively movable within said aquarium tank, said inlet housing being telescopically adjustable to any desired water depth of said tank, said pumping means comprising a pump priming member joined in flowing registry with a water-charging tube, said pumping priming member simultaneously acting as a debris-laden water reservoir, said water-charging tube further comprising an elongated tubular main body portion joined with a valve housing portion, said valve housing portion further comprising a right angle valve chamber in which is disposed a pair of associatingly functioning flipper valves acting to regulate the ingress and egress of water into said pump, a water discharge pipe being connected to said valve chamber, and filter means being in turn associated with said discharge pipe.

2. A pump according to claim 1 wherein said housing comprises an elongated tubular body having a funnel-shaped collar at its lower end and a cylindrically shaped collar at its upper end, and said cylindrically shaped collar being in turn integrally joined to another cylindrical collar sized so as to receive said elongated tubular main body portion of said water-charging tube in sliding but substantially airtight relationship, thereby rendering said pumping means telescopically adjustable within said housing.

3. A pump according to claim 2, wherein said filter means comprise a cloth filter bag.